(12) United States Patent
Naumann et al.

(10) Patent No.: US 6,290,305 B1
(45) Date of Patent: Sep. 18, 2001

(54) METHOD AND APPARATUS FOR PRODUCING LINEAR BRAKING TORQUE

(75) Inventors: Emil Naumann, Ebersbach; Hans-Georg Riedel, Pforzheim, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/458,748

(22) Filed: Dec. 10, 1999

(30) Foreign Application Priority Data

Dec. 23, 1998 (DE) .............................................. 198 59 617

(51) Int. Cl.[7] .............................. B60T 8/00; B60T 8/32; B60T 17/04; B60T 13/66; F16D 69/00
(52) U.S. Cl. .................... 303/112; 188/72.1; 188/181 T; 188/71.1; 188/251 A; 303/155
(58) Field of Search ................................. 303/3, 155, 112, 303/166, DIG. 3, DIG. 4, 9.61; 188/181 T, 251, 1.11, 72.1, 71.1, 156, 18 A, 71.5; 701/70

(56) References Cited

U.S. PATENT DOCUMENTS 4,043,607 * 8/1977 Signorelli et al. .

5,293,966 * 3/1994 Chareire .............................. 188/72.1

FOREIGN PATENT DOCUMENTS

| 3444827A1 | 6/1986 | (DE) . |
|---|---|---|
| 3515512 | 10/1986 | (DE) . |
| 4029114A1 | 4/1991 | (DE) . |
| 4400898C1 | 3/1995 | (DE) . |
| 06925A1 | 8/1998 | (DE) . |
| 11829C1 | 9/1998 | (DE) . |
| 19859617 * | 5/2000 | (DE) . |
| 1013522 * | 6/2000 | (EP) . |

* cited by examiner

Primary Examiner—Douglas C. Butler
(74) Attorney, Agent, or Firm—Crowell & Moring LLP

(57) ABSTRACT

A brake unit has a brake application device, a brake disc with a friction surface and a brake shoe with a friction lining which, during the actuation of the brake unit, acts by an application force Fs of the brake shoe on the friction surface of the brake disc. The friction surface of the brake disc is formed from a ceramic/metal composite material. A control device controls the application force Fs of the brake shoe during a braking procedure such that a defined braking torque results as a function of the application force. The brake shoe application force is increased by an increase in pressure such that an essentially linearly varying braking torque results. The invention also relates to a brake unit for carrying out this method by use of an electrohydraulic control device.

14 Claims, 2 Drawing Sheets

METHOD AND APPARATUS FOR PRODUCING LINEAR BRAKING TORQUE

BACKGROUND OF INVENTION

The present invention relates to a method of actuating a brake unit, a brake application device, a brake disc with a friction surface and a brake shoe with a friction lining. During the actuation of the brake unit, the friction lining acts by means of an application force Fs of the brake shoe on the friction surface of the brake disc. The friction surface of the brake disc is formed from a ceramic/metal composite material (CMC). A control device controls the application force Fs of the brake shoe during the braking procedure in such a way that a defined braking torque Mb results as a function of the application force Fs. The present invention also relates to such a brake unit.

DESCRIPTION OF PRIOR DEVELOPMENTS

The usual brake units in motor vehicles, for example, are equipped with brake discs or brake disc rotors formed of cast-iron material or grey cast iron. During interaction with the friction linings of the brake shoes during braking, an approximately linear relationship exists between the application force Fs acting at the brake shoe and the resulting braking torque Mb. In other words, the braking torque Mb varies linearly as a function of the application force. For the motor vehicle driver, this results in a certain actuation characteristic of the brake unit in the case of commercial servo systems, this giving the "feel" during the braking procedure that the braking effort becomes stronger as the driver actuates the brake pedal more powerfully and increases continuously with increasing pressure on the brake pedal.

To an increasing extent, brake discs and brake disc rotors are being developed which consist of ceramic/metal composite materials (CMC) or the friction surfaces which interact with the friction linings of brake shoes consist of a ceramic/metal composite material (CMC). With commercial servo systems, however, brake units which are equipped with such brake discs have a different braking characteristic from the conventional brake units described above. In particular, the resulting braking torque Mb is no longer linear as a function of the application force Fs but converges towards a maximum value, i.e. the slope becomes flatter with increasing brake pressure. Thus, however, the braking force distribution between the individual wheels changes. The car criver experiences this as a braking effort which no longer increases continuously with increasing pressure on the brake pedal but can only be further increased to a small extent. The usual actuation characteristic is no longer present. This is perceived as a factor implying a lack of safety.

SUMMARY OF THE INVENTION

The object of the present invention is, therefore, to provide a method of the type mentioned above by means of which, while retaining the conventional servo systems, the usual actuation characteristic is restored and the proven braking force distribution between individual wheels is achieved. The object of the present invention is, in addition, to provide a brake unit by means of which these objectives can be achieved.

This object is achieved in that the brake shoe application force is increased by an increase in pressure in such a way that an essentially linearly varying braking torque results.

Such a rise in pressure, which is produced by a control unit, therefore achieves the effect that the braking torque Mb varies linearly as a function of the application force Fs, even in the case of commercial servo systems associated with brake units having brake discs or friction surfaces made from ceramic/metal composite material. This restores the usual actuation characteristic, i.e. for the driver, the braking effort continuously increases with the pressure on the brake pedal. The proven braking force distribution between the individual wheels is ensured.

The brake unit according to the invention is characterized in that it has an electrohydraulic actuation system by means of which the application force of the brake shoe can be increased by an increase in pressure in such a way that an essentially linearly varying braking torque results.

The increase in pressure is achieved in an advantageous manner by switching on a pressure-increasing function, stored in the control device, an approximately parabolic pressure-increasing function for example.

The increase in pressure can be determined as a function of the instantaneous braking effort or as a function of the deceleration.

The control device of the brake unit according to the invention advantageously acts on the hydraulic pressure in the brake application device.

A further advantageous development provides for the friction surface of the brake disc rotor or the complete brake disc rotor or the complete brake disc to consist of a ceramic/metal composite material, preferably of a ceramic/aluminium composite material, for example based on aluminium oxide, titanium dioxide, boron trioxide and/or titanium boride with aluminium, such as is described in German Patent Application 197 06 925.8-45, or of a ceramic/silicon composite material, for example based on silicon carbide. A fiber-reinforced composite material, which has carbon fibers and/or silicon carbide fibers, for example, as reinforcement fibers is particularly preferred. Other fibers based on carbon, nitrogen, silicon or boron are, however, also suitable.

Long fibers, preferably in the form of fiber weaves or fiber lay-ups, are suitable as reinforcement fibers. Short fibers, preferably isotropically oriented short fibers (see DE 197 11 829 C1) are particularly preferred so that the friction surface or the brake disc has isotropic, i.e. uniform properties, in both the longitudinal and transverse directions.

The composite material can have a ceramic/silicon carbide or a ceramic/aluminium oxide, for example, as the ceramic component. Other ceramics, however, are also suitable.

The friction surface of the brake disc rotor and the brake disc rotor are preferably integrally configured and consist of the same material, i.e. of a CMC material. Particularly preferred is the manufacture of the entire brake disc integrally from a CMC material, which makes for particularly simple and low-cost manufacture.

The present invention is explained in more detail below with reference to the attached drawings.

Figure 1:
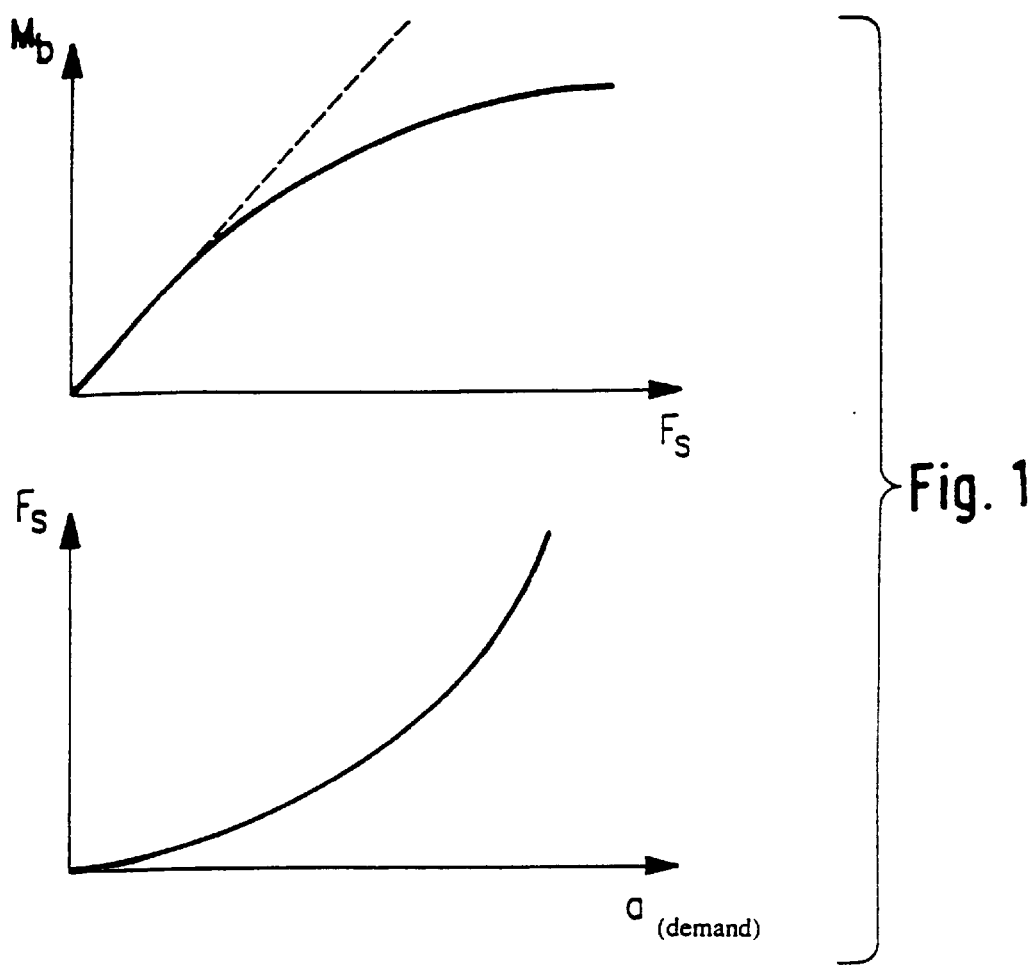
FIG. 1 shows a diagrammatic graphical representation of the braking torque Mb as a function of the application force Fs and a similar representation of a brake application function (braking force as a function of deceleration)

It may be seen from FIG. 1 that in the case of CMC brake discs or brake disc rotors, the braking torque Mb does not vary linearly as a function of the application force Fs of the brake shoe but converges towards a maximum value. An increase in the application force Fs is effected in order to restore a linear variation. This can take place as a function of the deceleration, as shown, but also, for example, as a function of the instantaneous braking effort. The increase in the application force Fs produces an increase in the braking torque Mb so that the variation of the curve is again linearized. When actuating the brake pedal, therefore, the vehicle driver does not notice that the application force Fs of the brake shoes has been increased more strongly than he had "intended", with the result that he again perceives the relationship between the pressure exerted by him on the brake pedal and the braking effort as being "linear" i.e. the braking effort increases continuously with pressure on the brake pedal.

Figure 2:
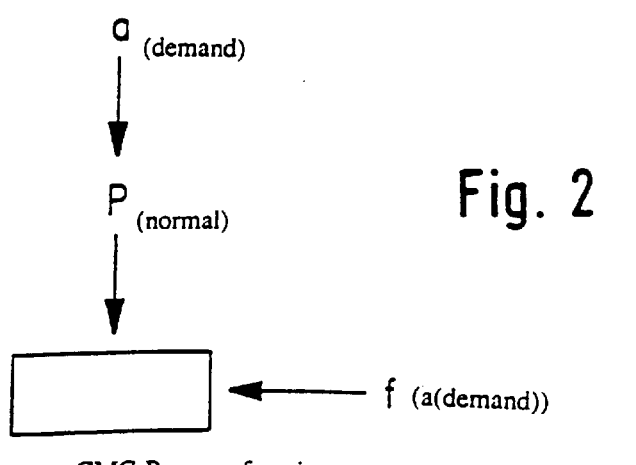
FIG. 2 shows a flow diagram of the method according to the invention.
Figure 3:
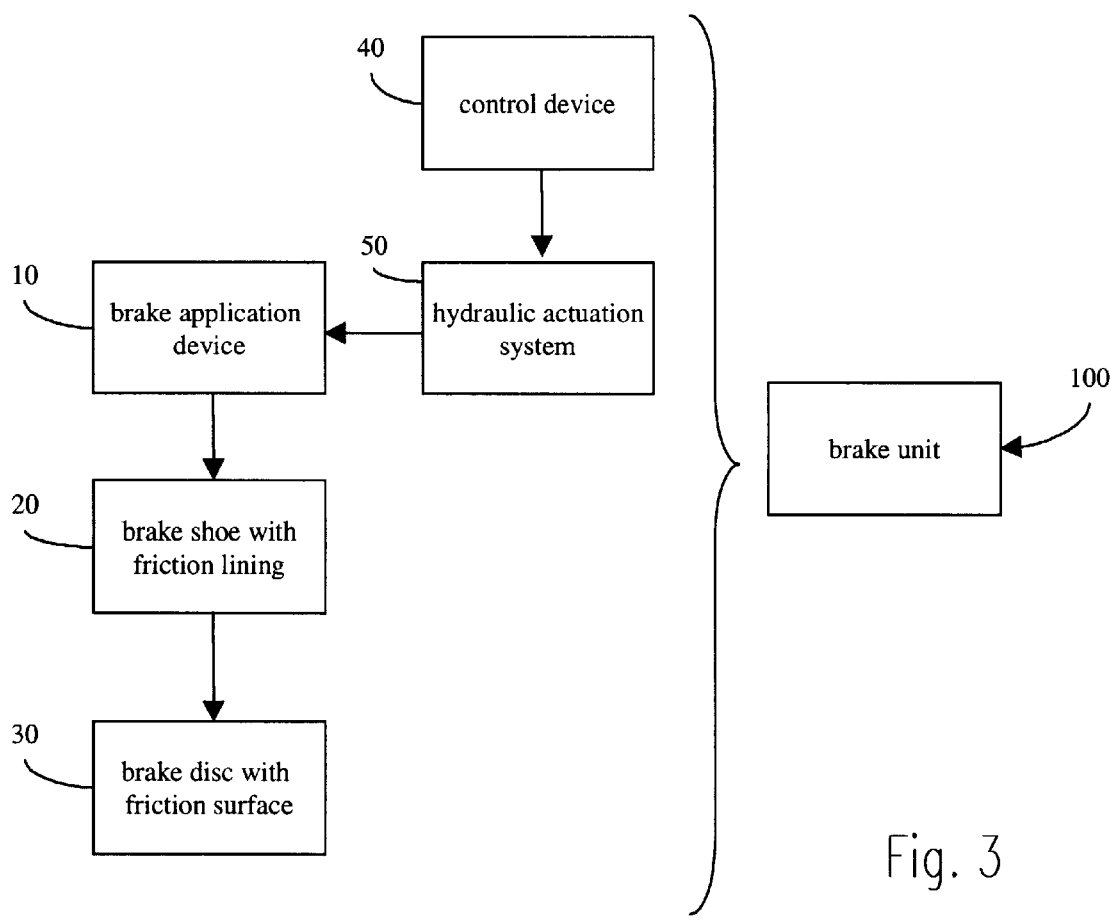
FIG. 3 shows a diagram of an embodiment of the apparatus for producing linear braking torque.

This is illustrated again in the flow diagram shown in FIG. 2 and in the apparatus illustrated in FIG. 3. The driver of a motor vehicle wishes to brake, i.e. he wants a certain deceleration a (demand). He actuates the brake pedal, whereupon a certain pressure P (normal) of the brake shoes or the friction linings 20 acts on the friction surface of the brake disc rotor 30. A "pressure function", which is activated during the deceleration, is stored in the control device 40 of the brake unit 100. The control unit 40 adds this pressure function to the usual pressure P (normal) by means, for example, of an electrohydraulic actuation system 50 in the brake unit 100, which system acts on the hydraulic pressure in the brake application device 10 and increases the pressure in accordance with the stored pressure function. In consequence, a new, higher pressure P(CMC) is exerted on the brake disc rotors 30. The pressure function is determined in such a way that in the case of a linear increase in P (normal), the finally resulting braking torque Ms likewise increases linearly.

Specifically, with reference to the apparatus illustrated in FIG. 3, the driver of a motor vehicle wishes to brake, i.e. he wants a certain deceleration a (demand). He actuates the brake pedal, whereupon a certain pressure P (normal) of the brake shoes or the friction linings 20 acts on the friction surface of the brake disc rotor 30. A "pressure function", which is activated during the deceleration, is stored in the control device 40 of the brake unit 100. The control unit 40 adds this pressure function to the usual pressure P (normal) by means, for example, of an electrohydraulic actuation system 50 in the brake unit 100, which system acts on the hydraulic pressure in the brake application device 10 and increases the pressure in accordance with the stored pressure function. In consequence, a new, higher pressure P(CMC) is exerted on the brake disc rotors 30. The pressure function is determined in such a way that in the case of a linear increase in P (normal), the finally resulting braking torque Ms likewise increases linearly.

What is claimed is:

1. A method of actuating a brake unit which has an application device, a brake disc with a friction surface and a brake shoe with a friction lining which, during the actuation of the brake unit, acts by an application force Fs of the brake shoe on the friction surface of the brake disc, the friction surface of the brake disc being formed from a ceramic/metal composite material, said method comprising;
   providing at least one control device;
   controlling the application force Fs of the brake shoe with the control device during braking;
   producing a defined braking torque Mb as a function of the application force Fs of the brake shoe; and
   increasing the brake shoe application force by an increase in pressure such that an essentially linearly varying braking torque results.

2. The method according to claim 1, wherein the increase in pressure is achieved by switching on a pressure-increasing function stored in the control device.

3. The method according to claim 1, wherein an approximately parabolic pressure-increasing function is switched on.

4. The method according to claim 1, wherein the increase in pressure is determined as a function of the instantaneous braking effort.

5. The method according to claim 1, characterized in that the increase in pressure is determined as a function of deceleration.

6. A brake unit comprising a brake application device, a brake disc with a friction surface and a brake shoe with a friction lining which, during the actuation of the brake unit, acts by an application force Fs of the brake shoe on the friction surface of the, brake disc, the friction surface of the brake disc being formed from a ceramic/metal composite material, a control device controlling the application force Fs of the brake shoe during braking, such that a defined braking torque Mb results as a function of the application force Fs, and an electrohydraulic actuation system for increasing the application force of the brake shoe by an increase in pressure such that an essentially linearly varying braking torque results.

7. The brake unit according to claim 6, wherein the brake application device operates under hydraulic pressure and wherein the control device acts on the hydraulic pressure in the application device.

8. The brake unit according to claim 6, wherein the friction surface of the brake disc is formed from an aluminum/ceramic composite material or a silicon/ceramic composite material.

9. The brake unit according to claim 6, wherein the friction surface of the brake disc comprises a fiber-reinforced composite material.

10. The brake unit according to claim 9, wherein the composite material comprises carbon fibers and/or silicon carbide fibers.

11. The brake unit according to claim 9, wherein the composite material comprises fiber weaves or fiber lay-ups formed of long fibers.

12. The brake unit according to claim 9, wherein the composite material comprises isotropically oriented short fibers.

13. The brake unit according to claim 6, wherein the composite material comprises a ceramic/silicon carbide or a ceramic/aluminum oxide as the ceramic component.

14. The brake unit according claim 6, wherein the friction surface of the brake disc is integrally configured with the brake disc and both consist of the same material.

* * * * *